June 10, 1969        P. E. TOBIAS        3,448,519
CONTROLLED DEPTH CUTTER
Filed Aug. 8, 1967
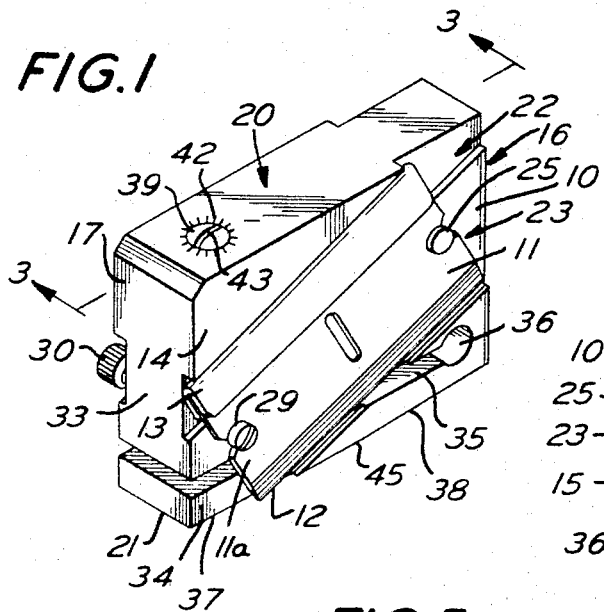
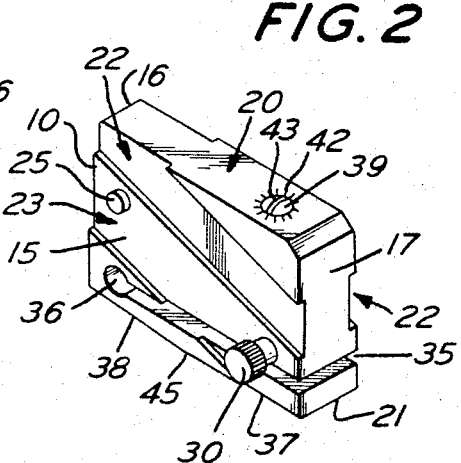
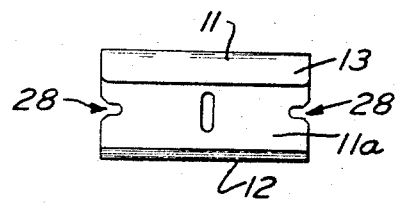
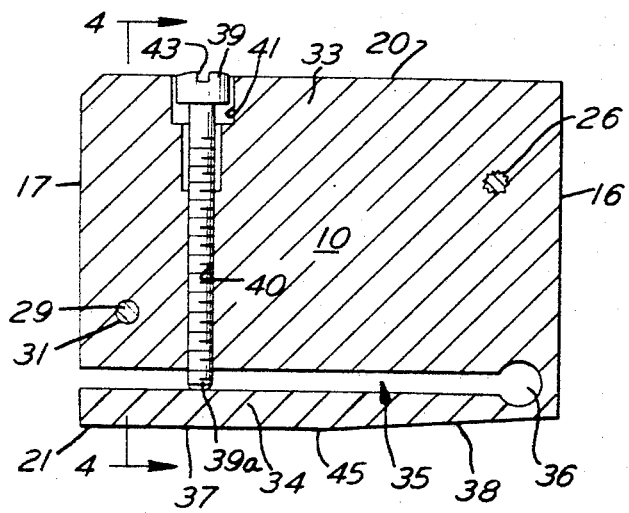
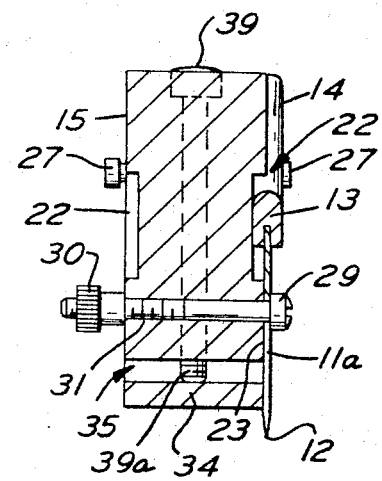
INVENTOR
PHILIP E. TOBIAS
BY
ATTORNEY

United States Patent Office 3,448,519
Patented June 10, 1969

3,448,519
CONTROLLED DEPTH CUTTER
Philip E. Tobias, Abington, Pa.
(2537 Mt. Carmel Ave., Glenside, Pa. 19038)
Filed Aug. 8, 1967, Ser. No. 659,077
Int. Cl. B26b 29/00, 5/00
U.S. Cl. 30—293          7 Claims

ABSTRACT OF THE DISCLOSURE

A controlled depth cutter wherein a blade is detachably mounted in a holder which holder has an adjustable foot portion to determine the blade edge exposure with exactitude and which can be used for right or left hand cutting.

BACKGROUND OF THE INVENTION

Field of the invention

This invention relates to a cutter with adjustable blade edge exposure for cutting a predetermined thickness of material.

Description of the prior art

The cutters previously available for cutting layers of thin material with adjustable blade edge exposure suffered from various shortcomings in that they dug into the material to be cut in unwanted places, were hard to handle, were not suitable for selective right or left hand use and did not provide a satisfactory range and close adjustment of cutting depths.

While the need for such a cutter has long been recognized, no satisfactory controlled depth cutter had been developed prior to that of the present invention.

For example in the graphic arts field it is often desirable when using multi-layered paste-up sheets to cut the top layer or layers only. The paste-ups used in printing have a sheet of film adhered to a carrier sheet. When it is necessary to remove a line or word for correction or other purposes, only the top or film layer can be cut and the carrier sheet must be left untouched so that no difficulties are encountered in the photographic processes that follow. By using the controlled depth cutter of the present invention the film layer or layers can be cut without the carrier sheet being affected.

SUMMARY OF THE INVENTION

The principal object of the present invention is to provide a controlled depth cutter wherein the depth of cut may be precisely and easily varied and wherein the cutting depth adjustment is maintained.

A further object of the present invention is to provide a controlled depth cutter which can be used for right or left hand operation.

A further object of the present invention is to provide a controlled depth cutter which may be accurately positioned for cutting without engaging the blade with the surface to be cut until desired.

A further object of the present invention is to provide a controlled depth cutter wherein the cutter blade may be easily and quickly replaced.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which:

FIG. 1 is a perspective view of the controlled depth cutter in accordance with the invention;

FIG. 2 is a perspective view similar to FIG. 1 but reduced in size and of opposite hand;

FIG. 3 is a vertical sectional view taken approximately on the line 3—3 of FIG. 1;

FIG. 4 is a vertical sectional view taken approximately on the line 4—4 of FIG. 3; and FIG. 5 is an elevational view of reduced size of a single edge blade which is particularly suitable for use with the invention.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the controlled depth cutter includes a main cutter body 10 with a cutting blade 11 of conventional type fastened thereto. The cutting blade 11, as illustrated in FIG. 5 is preferably a single edged razor blade of well known type with cutting edge 12, top rim 13, and central body 11a.

The body 10 as shown in FIGURE 1 can be of steel, aluminum or rigid plastic and is of substantially rectangular shape with front and rear faces 14 and 15, right and left faces 16 and 17, and top and bottom faces 20 and 21. The front face 14 as shown more clearly in FIGURE 1 is provided with an upper diagonal groove 22 which in the embodiment illustrated is of a width of 3/8 inch and a depth of 1/32 inch. The upper groove 22 is at an angle of approximately 22½ degrees with respect to the top face 20, extends completely across the front face 14, and is adapted to receive the top rim 13 of the razor blade 11.

The face 14 has a lower groove 23 for reception of central body 11a, of razor blade 11 which groove intersects the upper groove 22 and is in parallel relationship, is of approximately ½ inch width and 0.010 inch depth. A pin 25 is fixedly engaged in main cutter body 10 and extends through body 10 from front face 14 to rear face 15. The pin 25, as shown in FIGS. 3 and 4, has a central knurled body 26 and opposed outer undercut heads 27. The pin 25 is of a length such that the head 27 on face 14 extends above the groove 23 a sufficient height so that the notches 28 of blade 11 will engage pin 25 between the head 27 and the groove 23 when in assembled position.

A screw 29 is provided which extends through a hole 31 in body 10 from front face 14 to rear face 15 and engaged with one of the opposite notches 28 in the side edge of the blade 11.

The screw 29 has a knurled nut 30 on the end thereof for quick installation and removal.

The main cutter body 10 comprises an upper portion 33 and a lower cantilever foot portion 34. The foot portion 34 is separated from the upper portion by a slot 35 of approximately 1/16 inch in this embodiment which terminates in a hole 36 at its rearmost end. The bottom face 21 of foot 34 has a front portion 37 which is parallel to the top face 20 in unextended position and a rear portion 38 extending therefrom which is angled upwardly towards the rear with respect to front portion 37 to provide a support for the cutter in rest position. The intersection at 45 of the front and rear portions 37 and 38 provides a fulcrum.

An adjusting screw 39 is provided extending from the top face 20 down through an internally threaded opening 40 in body 10 and has the end of its shank 39a in contact with the foot 34 for effecting relative vertical movement of the foot 34 to provide adjustable blade edge exposure. A counterbore 41 at the upper end of the opening 40 accommodates movement of the head of the screw 39.

The top face 20 may be provided with radial serrations 42 around the head of screw 39 to provide indicia for reference adjustment purposes upon turning of the slot 43.

The rear face 15 is similar to the front face 14 and is provided with grooves 22 and 23 as for face 14, and is used for left hand cutting operations as the preferred position of the blade 11 is against the straight edge when cutting.

The mode of operation will now be pointed out.

The blade 11 is inserted in grooves 22 and 23, on either front or rear face 14 or 15 as desired with notch 28 engaged by head 27 of pin 25.

The screw 29 is inserted in hole 31 and engages notch 28 of blade 11 and nut 30 tightened. The screw 39 is rotated so that foot 34 is moved to a position giving the desired amount of blade edge exposure below face 21. The cutter body 10 is held against a straight edge (not shown) with pressure on the rear so that the cutter body 10 rests on rear portion 38 and the blade edge 12 is out of engagement.

When the cutter is positioned properly for cutting, pressure is shifted to the front so that the cutter body 10 rests on front portion 37 of foot 34 and the blade edge 12 then engages the material to be cut. The body 10 can be manipulated as desired along the straight edge and the predetermined depth of cut maintained. The blade 11 can be replaced as desired, used on either front or rear face 14 or 15 and the blade edge 12 exposure can be varied by turning screw 39 to move foot 34 up or down as desired. It will thus be seen that structure has been provided to attain the objects of the invention.

I claim:

1. A controlled depth cutter which comprises
   a main cutter body having top and bottom faces and front and rear faces,
   at least one of said front and rear faces having a pair of inclined grooves,
   a blade member having portions engaged in said grooves and having a cutting edge,
   a pin engaging one edge of said blade member,
   a screw engaging another edge of said blade and acting with said pin to retain said blade in said grooves, and
   a foot connected to said cutter body and being movable with respect thereto to determine the exposure of the blade member edge for cutting.

2. A controlled depth cutter as defined in claim 1 in which
   an adjusting member is provided carried by said body and engaging said foot to movably position said foot.

3. A controlled depth cutter as defined in claim 1 in which
   said foot has a front portion parallel to the top of said body and a rear portion angled upwardly with respect to the top of said body to provide a fulcrum on said foot.

4. A controlled depth cutter as defined in claim 1 in which
   said pair of inclined grooves comprise an upper and a lower groove.

5. A controlled depth cutter as defined in claim 4 in which
   said blade member is provided with a stiffening rim on the top thereof engaged in said upper groove.

6. A controlled depth cutter as defined in claim 3 in which
   said foot is separated from said main cutter body by a slot.

7. A controlled depth cutter as defined in claim 2 in which
   indicia are provided on said cutter body for said adjusting member.

References Cited

UNITED STATES PATENTS

| | | | |
|---|---|---|---|
| 1,592,437 | 7/1926 | Bradshaw | 30—293 |
| 1,843,535 | 2/1932 | Arnold | 30—293 X |
| 2,091,337 | 8/1937 | Sahl | 30—296 |
| 2,291,075 | 7/1942 | Hanson | 30—2 |
| 2,966,742 | 1/1961 | Harian | 30—314 |

ROBERT C. RIORDON, *Primary Examiner.*

J. C. PETERS, *Assistant Examiner.*

U.S. Cl. X.R.

30—314